Figure 1:
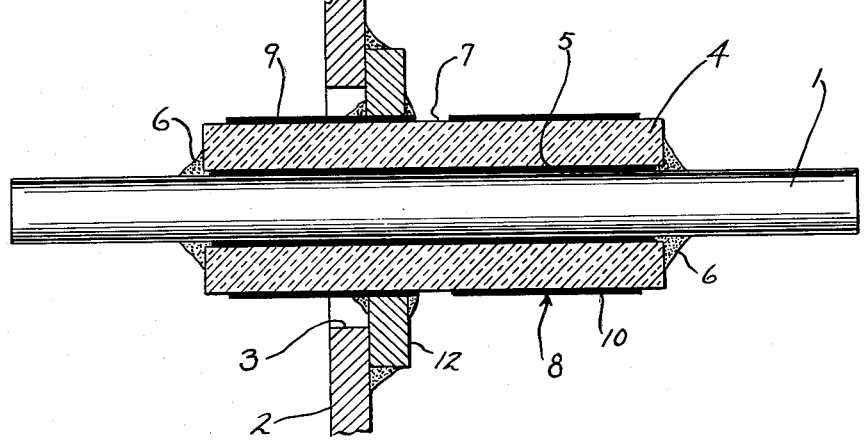

Oct. 31, 1961    H. M. SCHLICKE    3,007,121
DERESONATED CAPACITOR
Filed Feb. 5, 1959    4 Sheets-Sheet 1

INVENTOR
Heinz M. Schlicke
BY
Arthur H. Seidel
ATTORNEY

Oct. 31, 1961  H. M. SCHLICKE  3,007,121
DERESONATED CAPACITOR
Filed Feb. 5, 1959  4 Sheets-Sheet 2

INVENTOR
Heinz M. Schlicke
BY
Arthur H. Seidel
ATTORNEY

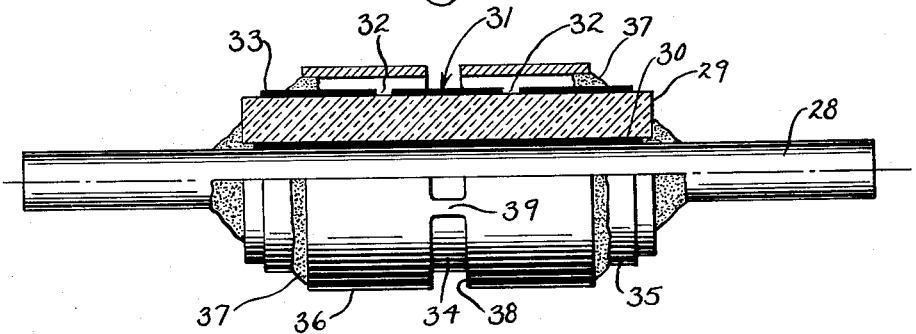
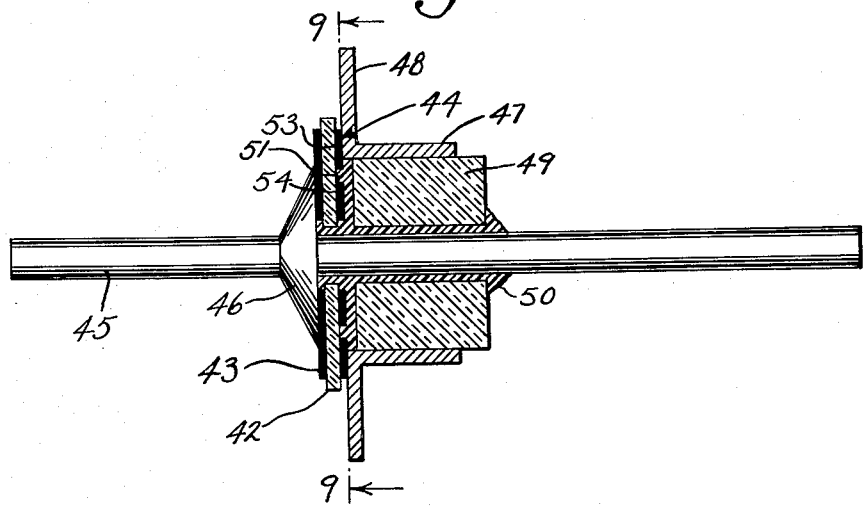
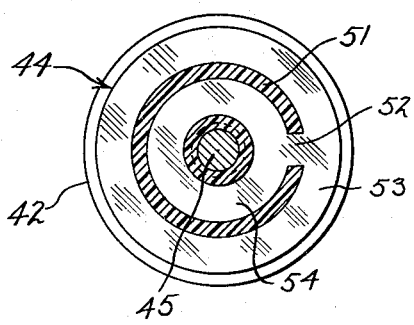
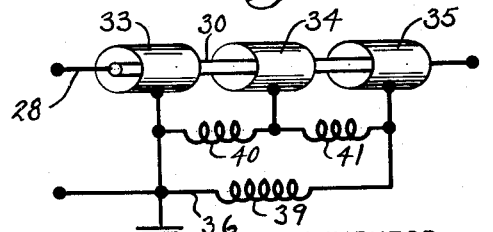

Oct. 31, 1961  H. M. SCHLICKE  3,007,121
DERESONATED CAPACITOR
Filed Feb. 5, 1959  4 Sheets-Sheet 4

INVENTOR
Heinz M. Schlicke
BY Arthur H. Seidel
ATTORNEY

United States Patent Office 3,007,121
Patented Oct. 31, 1961

3,007,121
DERESONATED CAPACITOR
Heinz M. Schlicke, Fox Point, Wis., assignor to Allen-Bradley Company, Milwaukee, Wis., a corporation of Wisconsin
Filed Feb. 5, 1959, Ser. No. 791,422
15 Claims. (Cl. 333—79)

This invention relates to capacitors for use primarily with very and ultra-high frequencies and it more specifically resides in a capacitor having an electrode of narrowed crosswise dimension at one or more points to present a small conductive path at such point or points to thereby interrupt currents in the electrode that are associated with resonant conditions to eliminate, in whole or in part, such conditions of resonance.

It is common practice to shield high frequency circuits and generators in electronic equipment to minimize radiation, and to pass conductors through the shielding for introducing or withdrawing low frequency voltages and currents. In passing conductors through such shielding the problem arises of retaining the high frequencies within the shielding and prohibiting escape of these frequencies over the low frequency conductors. A general practice is to insert a capacitor between the conductor and the shielding to by-pass the high frequencies from the conductor to the shielding at the point where the conductor exits from the shielded area. Such capacitors have taken special tubular and discoidal forms to minimize inductive effects that may otherwise increase the transfer impedance presented to the high frequencies.

The present invention provides a capacitor having a specialized electrode geometry resulting in an enhanced low transfer impedance throughout a wide range of very and ultra-high frequencies. In one of the preferred forms an electrode is subdivided by a nearly complete interruption into at least two electrode portions. One of the portions is joined in the circuit, usually by connection to shielding or a lead, and the remaining portion is joined to the former through a small connecting bridge introducing a desired degree of inductance, which in combination with the distributed circuit parameters of the device results in a low transfer impedance which closely approximates that of a pure capacitance.

It is an object of this invention to provide a capacitor having a low transfer impedance throughout a wide range of frequencies.

It is another object of this invention to provide a capacitor with low transfer impedance at ultra-high frequencies which lends itself to commercial production techniques.

It is another object of this invention to provide a feed-through capacitor that is deresonated throughout a wide range of very and ultra-high frequencies.

The foregoing and other objects and advantages of this invention will appear from the following description. In the description reference is made to the accompanying drawings, which form a part hereof, and in which there is shown by way of illustration and not of limitation specific forms in which the invention may be embodied.

Figure 2:
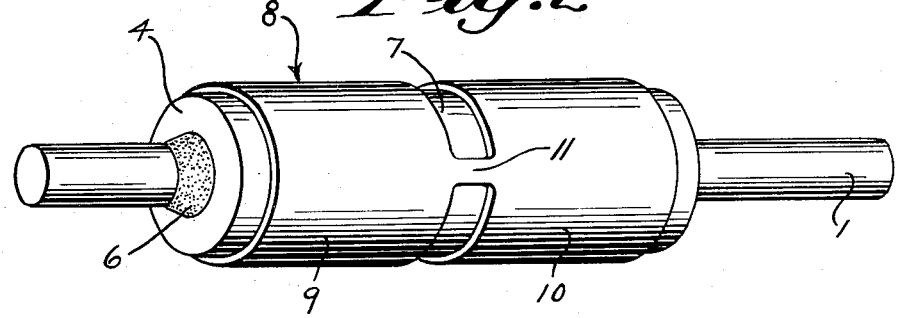

In the drawings:

FIG. 1 is a view in longitudinal cross section of a tubular feed-through capacitor mounted in a panel opening and in which the invention is embodied, FIG. 2 is a view in perspective of a portion of the capacitor shown in FIG. 1.

Figure 3:
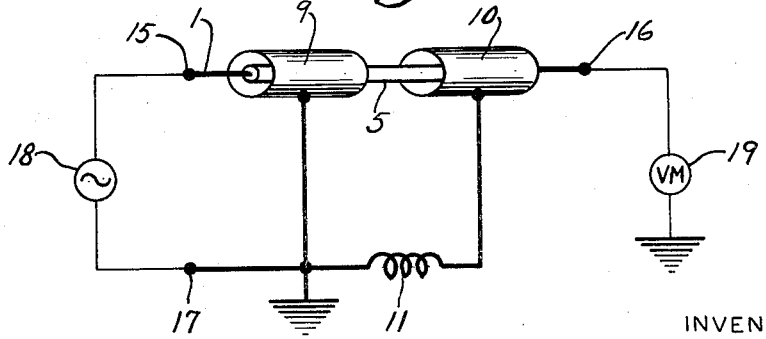
Figure 4:
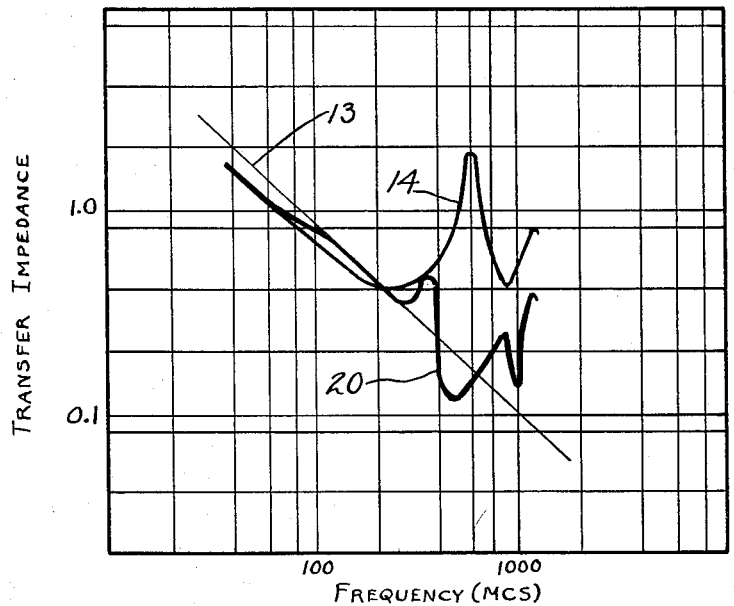
Figure 5:
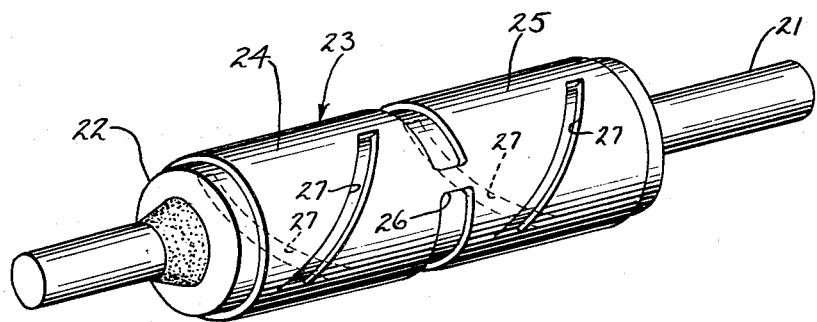
Figure 10:
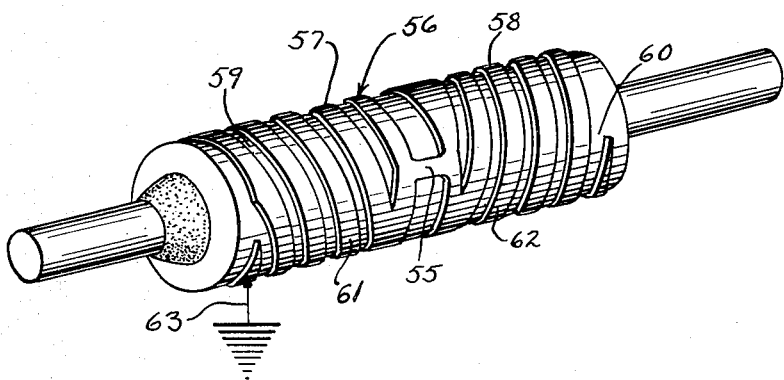
Figure 11:
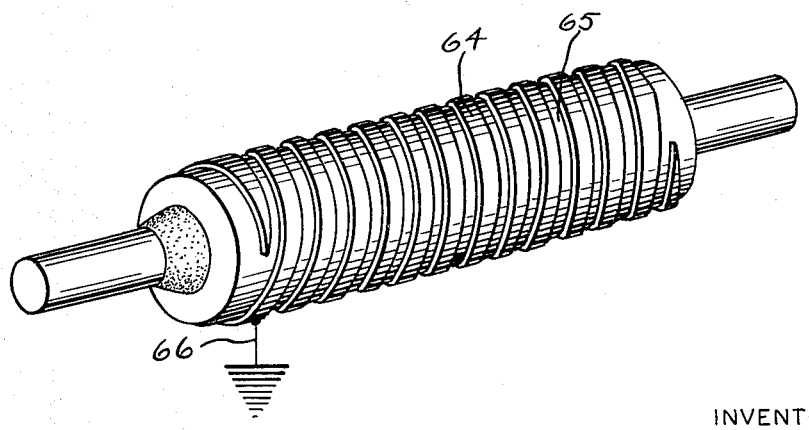

FIG. 3 is a schematic wiring diagram of a simplified equivalent circuit representative of the capacitor, FIG. 4 is a graph of the variation of transfer impedance with frequency presented by the capacitor as compared with that of a normal tubular capacitor, FIG. 5 is a view in perspective of another form of capacitor embodying the invention, FIG. 6 is a view in partial cross section of still another form of capacitor embodying the invention, FIG. 7 is a schematic wiring diagram of a simplified equivalent circuit for the complex capacitor of FIG. 6, FIG. 8 is a view in cross section of a discoidal feed-through capacitor embodying the invention, FIG. 9 is a view in transverse cross section of the discoidal capacitor of FIG. 8 viewed in the plane 9—9, FIG. 10 is a view in perspective of another embodiment of the invention as applied to a tubular capacitor, and FIG. 11 is a view in perspective of another tubular capacitor embodying the invention.

Referring now to the drawings, and more particularly to FIGS. 1 and 2, there is shown a central conductor 1 extending from end to end of a feed-through capacitor which is to carry either direct current or currents of low frequencies into or from a shielded area. A portion of a shielding panel 2 is shown in FIG. 1 with an opening 3 through which the conductor 1 extends. A thin walled tubular ceramic dielectric 4 encircles the conductor 1 for a major portion of its length, and coated on the inner wall forming the central opening of the dielectric 4 is an inner electrode 5 preferably formed of a silver paste fired in place so as to be intimately bonded to the dielectric 4. At each end of the dielectric 4 a solder deposit 6 electrically joins the conductor 1 with the inner electrode 5 and mechanically secures the elements to one another.

About the outer cylindrical surface 7 of the dielectric 4 there is deposited an outer electrode 8, also of fired silver paste in intimate physical contact with the dielectric surface. The outer electrode 8 is transversely slotted to nearly fully sever, or subdivide it into two distinct electrode portions 9 and 10, and as is particularly shown in FIG. 2 the electrode portions 9 and 10 are electrically joined by a small bridging connection 11. The bridging connection 11 is an integral continuation of the silver paste forming the electrode portions 9 and 10 of the electrode 8, and is of very narrow circumferential extent. The particular function of the connection 11 in respect to the electrode portions 9 and 10 will be more fully discussed hereinafter.

Referring back to FIG. 1, there is shown a mounting ring 12 closely surrounding and soldered to the electrode portion 9. The mounting ring 12 is brought up against the shielding panel 2, and is soldered in place with the capacitor extending through the opening 3. The completed feed-through capacitor is in a position for connection to circuit leads whereby the central conductor 1 may be connected to one end, for example the left hand end, to a circuit element within a shield area generating and utilizing very and ultra-high frequencies, and the other end of the conductor 1 may be connected to circuit elements outside the shielded area which are not to receive or be subjected to the very and ultra-high frequencies appearing within the shielded area.

Plain tubular capacitors fail to act as satisfactory feed-through capacitors for transferring higher frequencies from a conductor, such as conductor 1, to associated shielding. If a capacitor actually functioned purely as a capacitance throughout the spectrum of frequencies for which it is intended its transfer impedance, i.e. impedance through the capacitor from electrode to electrode and hence from central conductor to shielding panel, would decrease hyperbolically with increasing frequency. However, this is not the case since internal conditions within the capacitor will cause sharp increases in transfer impedance at certain frequency values.

The dielectrics employed in capacitors of the type herein concerned are of the high K ceramic type, as exemplified by the titinate materials that have been so favorably received, and for the purpose of constructing a capacitor in accordance with the present invention such high dielectric constant materials are to be employed in which K is greater than the value of 10. Wave lengths in these dielectrics are reduced from that in free space by the value of $1/\sqrt{K}$, and for the frequencies with which capacitors of this invention are employed the dimensions of the dielectric are consequently such as to have a length approximating one half a wave length. Internal resonant conditions may then occur for particular frequencies that are intended to be by-passed through the capacitors.

For the resonant conditions that occur, conduction currents flow back and forth in each electrode in an oscillatory manner with accompanying electric and magnetic fields within the dielectric. Oscillatory energy conversions that then take place in the capacitor increase transfer impedance, and this effect is most pronounced at frequencies for which the capacitor is half a wave length or multiples thereof. The resonance can be likened to a parallel resonant circuit of lumped parameters which imposes a high impedance to a circuit. Similarly a feed-through capacitor presents a high transfer impedance at the resonant frequencies, whereby its effectiveness as a by-pass is lost. A more rigorous analysis of the internal resonance is based on likening the capacitor to a transmission line. Then, for the condition at which the longitudinal length of the tubular capacitor is one-half the wave length in the dielectric a resonant condition occurs similar to that of a transmission line. Capacitive charging currents are a maximum near the ends of the electrodes, and conduction currents travelling longitudinally through the electrodes are a maximum near the longitudinal centers. The impedance presented by the capacitor between its central conductor 1 and a chassis 2 sharply rises for frequencies where the transmission line length is a multiple of one-half a wave length. Transfer impedance rises to such values that the capacitor loses the necessary effectiveness for bypassing the high frequencies. The effect of the internal resonance is shown in the graph of FIG. 4, wherein the abscissa is frequency and the ordinate is transfer impedance. The fine line 13 represents a true capacitance and the solid line 14 represents actual conditions in a normal tubular capacitor. It is seen for a frequency of approximately 600 mcs. that the transfer impedance of a particular normal tubular capacitor sharply increased due to internal resonance. For the curve 14 a tubular feed-through capacitor was employed having an outside diameter of .195 cm., a length of 95 cm. and a dielectric constant of $K=1700$. The data for the curve was taken at a temperature of 125° C.

In the present invention, one of the electrodes of a capacitor is slotted, or nearly fully interrupted, so as to divide that electrode into two portions, such as portions 9 and 10 shown in FIGS. 1 and 2. The interruption or subdividing of the electrode 8 is not complete, but rather a bridging connection 11 is retained to electrically join the two subdivided portions 9, 10. One of the electrode portions, portion 9 in FIG. 1, is connected to the high frequency source, which is normally done through the shielding 2 which is grounded. The other electrode portion 10 is not so connected, but rather is partially isolated through the medium of the connection 11. A simplified schematic representation of this slotted capacitor construction is shown in FIG. 3. In actuality, resonance within the dielectric and its electrodes is dependent upon distributed circuit parameters, which causes any analysis based on consideration of lumped circuit elements to be but an approximation. The central conductor 1 is represented by a heavy line with its ends as terminals 15 and 16. The inner electrode 5 is portrayed as extending between and coaxial with the outer electrode portions 9 and 10 to form a pair of transmission lines therewith. The inductance along the electrode 5 and the conductor 1 has been neglected in the representation of FIG. 3, although it may assume importance in detailed mathematical analysis of the device. The bridging connection 11 between electrode portions 9, 10 is represented as an inductance, and the electrode portion 9 is shown as grounded, a normal condition when joined to a shielding panel. A terminal 17 is also shown as directly joined to the electrode portion 9, to indicate a connection back to a high frequency source 18. The source 18 represents the high frequency within a shielded area, and the terminal 16 is joined to a volt meter 19 that is grounded at one end and thereby connected to the grounded electrode portion 9. It is apparent from FIG. 3 that the electrode portion 10 stands off from the ground connection and is isolated to a degree by virtue of the induction of the bridging connection 11. It is a discovery of this invention that this arrangement has a deresonating effect of great benefit, whereby sharp increases in transfer impedances through the capacitor are virtually eliminated, or shifted into frequency spectrum for which the capacitor is not normally intended. Curve 20 in FIG. 4 is representative of a capacitor constructed in accordance with the discovery of this invention, and the capacitor from which curve 20 was derived was of like dimension as the capacitor for curve 14 with the exception that the outer electrode had been subdivided, or slotted, as shown in FIGS. 1 and 2.

The dimensions of the bridging connection 11 should be so selected that for the lower frequencies to be by-passed, such as the lower value in the very high frequency range (30 mcs. as an example), the inductive effect thereof is small. The overall dimensions of the entire capacitor should preferably also be such that for these frequency values the length of the dielectric is considerably less than one-half the wave length in the dielectric. The total capacitance of the capacitor is then effective to present a minimal transfer impedance to this order of frequency. As the ultra-high frequencies are encountered the inductive effect of the bridging connection 11 increases, and this inductance becomes such as to curtail resonant currents with a very desirable resulting decrease in transfer impedance from that of a normal tubular capacitor. The unwanted peaks, such as exemplified by curve 14, are eliminated, and the improved performance of curve 20 is achieved.

A further effect of the subdivision of the outer electrode 8 is to arrive at a pair of capacitor portions 9, 10 which individually are of a longitudinal length less than one-half the wave length in the dielectric at the higher order of frequencies to which the capacitor is to present a low transfer impedance. In the present practice of this invention the frequencies which are intended to be bypassed lie in the very and ultra-high frequency spectrum, and in general the bridging connection 11 in a tubular capacitor as shown in FIGS. 1 and 2 is of the order of ten circumferential degrees or less. However, the relation of dimensions of not only the bridging connection 11, but also of electrodes and dielectric, with respect to transfer impedance at any particular frequency is extremely complex, to the extent that simple generalization as to proportions appears to be foreclosed.

For the circuit of FIG. 3 the expression Z can represent the characteristic impedance of each of the two transmission line sections presented by electrode portions 9, 10 in combination with the inner electrode 5. This quantity Z is dependent upon cross section and is not a function of length. The expression $b_1$ may be used to designate the phase measure of the transmission line formed by electrode portion 9 and electrode 5, and the expression $b_2$ may then be used to designate the phase measure of the transmission line formed by electrode portion 10 and electrode 5. The "phase measure" is a quantity dependent upon mechanical length times the square root of the dielectric constant multiplied by $2\pi$ over the wave length in air, This then, is a quantity involving length, frequency and the choice of dielectric material. The following expression may be derived for the transfer impedance $Z_T$ in terms of the above quantities Z, $b_1$, and $b_2$, wherein L is the inductance of the bridging connection 11.

$$Z_T = \frac{jwL - jZ/\sin b_2}{\cos b_1 - \frac{wL}{Z}\sin b_1 + \sin b_1 \cot b_2}$$

The denominator is a function passing through zero value at certain frequencies. If the numerator be permitted to be of a large finite value at the moments the denominator passes through zero the transfer impedance $Z_T$ becomes infinite. To avoid such an occurence values must be selected for the value of L and other circuit portions to have the numerator zero, or nearly so, at the instants when the denominator is zero. The calculations required to achieve the desired result are readily seen to become highly complex.

Referring now to FIG. 5, there is shown therein another embodiment of the invention. A conductor 21 emerges from each end of the capacitor and is encircled by a dielectric 22 which has an inner electrode, not shown, joined to the conductor 21 similarly as the inner electrode 5 of FIGS. 1 and 2 is joined to the central conductor 1. The outer cylindrical surface of the dielectric 22 has coated thereon an electrode 23 subdivided into portions 24 and 25 that are electrically joined by a bridge 26. Thus far, the description of the capacitor of FIG. 5 is like that of the one shown in FIG. 2. In FIG. 5 each of the electrode portions 24, 25 are, however, individually subdivided by a pair of slots 27. Each slot 27 extends along a helical or circumferential path for approximately half the circumference of the electrode 23. It is an additional discovery of this invention that the performance can be enhanced by the inclusion of circumferentially extending slots such as 27. The frequency range in which the transfer impedance is kept at low values is extended at the upper end of the spectrum, and further it has been found that the dimensioning of the supplemental slots 27 is less critical than in the case of the dimensioning of the bridge 26. The particular geometry for the slots 27, as well as that of the electrode portions 24, 25 may be varied to suit individual applications. The purpose of the slots 27 is to break up the continuity of the associated electrode portion to interrupt resonant currents within this portion alone, similarly as slotting to create the bridge 11 of FIGS. 1–3 interrupts resonant currents.

Another form of the invention is shown in FIG. 6, wherein a tubular capacitor has a central conductor 28 encircled by a dielectric 29 having an inner electrode 30. In this particular instance the outer electrode 31 is subdivided by a pair of transverse slots 32 into a set of three outer electrode portions 33, 34 and 35. The slots 32 do not completely interrupt the electrode 31, and there remains small connecting bridges, not shown in FIG. 6, that join the electrode portions 33–35 similarly as the bridge 11 of FIG. 2 joins electrode portions 9 and 10. An outer conducting shell 36 encircles and is radially spaced from the electrode 31. Solder connections 37 at the ends of the shell 36 electrically join it to the electrode portions 33 and 35. There is no direct connection between the shell 36 and the electrode portion 34.

The shell 36 has a transverse slot 38 that nearly completely interrupts the shell 36, but leaves a narrow conductive bridge 39, so that the configuration of the shell 36 may be characterized as being similar to a subdivided electrode. The bridge 39 is dimensioned to have inductive properties at the higher frequencies to be by-passed through the capacitor, and in mounting the capacitor of FIG. 6 the electrode portion 33, or the associated left hand portion of the shell 36, is secured to a panel, or the like, to form one terminal of the network presented by the complex capacitor of this figure. The other connecting terminals for the capacitor of FIG. 6 are afforded by the two ends of conductor 28, and in FIG. 7 there is shown a simplified circuit diagram representative of the capacitor of FIG. 6. Parts in FIG. 7 are indicated by like numerals as appear in FIG. 6, and the connecting bridges between the electrode portions 33–35 are represented in FIG. 7 by the inductances 40, 41. In this form of the invention the electrode portions 34, 35 are each connected to the terminal electrode portion 33 through narrow connecting links, similarly as the electrode portion 10 of FIGS. 1 and 2 is connected to the terminal electrode portion 9 through the connecting bridge 11. A capacitor of this form, in which more than one electrode portion is joined through a narrow conductive bridge to a grounded electrode portion, also exhibits extremely desirable low transfer impedance characteristics through a wide range of very and ultra-high frequencies.

Still another form of the invention is shown in FIG. 7, where it is applied to a discoidal feed-through capacitor. Here, a dielectric 42 is in the form of a thin ringlike wafer having an electrode 43 on one face and a more complex electrode 44 on the opposite face. The electrode 43 is directly connected to a conductor 45 having a radial flange in the form of a truncated cone 46. The cone 46 abuts the electrode 43 for providing the proper electrical connection. The opposite electrode 44 joins with a flanged circular cylindrical housing 47, which presents a flange 48 for mounting the capacitor. The housing 47 fits snugly about a ceramic insulating tube 49, which in turn encircles the conductor 45. A resin filler 50 secures the parts to one another and fills the voids between the tube 49, the conductor 45 and the dielectric 42. As is more particularly shown in FIG. 9, the electrode 44 is subdivided by a circular slot 50 that extends for nearly a complete circle. It is terminated just short of a complete circle to provide a connecting bridge 52 between the two subdivided portions 53 and 54 of the electrode 44. The radially outer portion 53 is joined to the housing 47, and the radially inner portion 54 is partially isolated by the medium of the narrow bridge 52.

The forms of the invention hereinbefore described present a capacitor that has a slotted electrode nearly completely interrupting it transversely of a direction in which resonant currents tend to flow. A portion of the partially interrupted electrode is grounded, or otherwise placed directly in circuit, with a resulting circuit for the capacitor that has a partially isolated electrode portion. This form of capacitor provides a deresonated feed-through ideal for isolating very and ultra-high frequencies within a shielded area. The invention accomplishes the desired deresonation with dielectrics of K greater than 10 and in the frequency spectrum of very and ultra-high frequencies commencing at the order of 30 mcs. and extending above the order of 1000 mcs. The division of an electrode is preferably near the center of the length where resonant conduction currents are otherwise of greatest value. In pracitce it has been found for the form of FIGS. 1–3 that the grounded electrode portion may be slightly longer than the ungrounded portion. The division leaves a conductive connection that introduces inductive reactance at the higher frequencies which gives a very substantial electrical characteristic to the circuit of the capacitor. In addition the electrode division creates shorter electrode lengths which will not be a half wave length, a condition conducive of resonance, until much higher frequencies are encountered. It is an object of the invention to provide in particular forms of the invention electrode lengths that will be less than a half wave length for the frequencies to be by-passed.

In FIG. 10 there is shown another form of the invention in a tubular capacitor that embodies a conductive bridge 55 similar to the bridges 11 and 26, which subdivides an outer electrode 56 into electrode portions 57 and 58. The electrode portions 57, 58 have helical cuts 59, 60 respectively that leave narrow electrode bands 61 and 62 as the principal components of the electrode portions 57, 58. The bands 61 and 62 are of narrow width to introduce inductance along the entire length of the electrode 56. In this fashion resonant currents are impeded at points other than near the mid-length of the electrode, as is done by the inductance of the short bridge 55. When the capacitor of FIG. 10 is placed in circuit it is preferable to ground, or otherwise connect, the electrode 56 at one end, as at 63.

It may be desirable in some applications to distribute inductance along the entire electrode length and to achieve satisfactory operation without a subdivision into discreet electrode portions. A form of the invention in which this has been done is shown in FIG. 11, which is similar to FIG. 10 without a bridge 55. The electrode 64 has a helical cut 65 leaving a narrow band along the entire length of the electrode to distribute inductance evenly along the entire length. In use the capacitor of FIG. 11 is preferably grounded at one end, as at 66.

The invention, in its several forms, introduces current paths in an electrode of a capacitor that impede resonant conduction currents that may travel across the capacitor electrodes. Transfer impedance characteristics are enhanced such that the capacitors may better function throughout a range of very and ultra-high frequencies.

I claim:

1. In a capacitor for use with radio frequencies at which an electrode dimension may approach a half wave length the combination for maintaining a low transfer impedance through the capacitor at such radio frequencies comprising a dielectric; a first electrode along one face of the dielectric; and a second electrode along the opposite face of the dielectric which has a narrow crosswise dimension one point to divide the second electrode into two portions that each in combination with the first electrode present a transmission line characteristic at the frequencies of use, and to present an inductive impedance to current flow between the two portions; said first electrode and one of said portions being adapted for connection into a circuit whereby the other of said portions is joined to such circuit solely through the inductance connecting the two portions together.

2. In a capacitor for use at radio frequencies the combination for maintaining a low transfer impedance through the capacitor at such radio frequencies comprising a dielectric; an electrode along one side of the dielectric adapted for connection into a circuit; and a second electrode along the opposite side of the dielectric which is divided into two portions that each have a transmission line characteristic with the other electrode at the frequencies of intended use, said electrode portions being joined to on another by a narrow inductive connecting bridge of a length that is equal to a minor part of the length of either of said electrode portions, whereby one of said portions is adapted for connection into a circuit and the other portion is solely joined to such circuit through said inductive bridge and the portion directly connected to such circuit.

3. In a capacitor the combination comprising a dielectric having a value of K greater than 10; an electrode intimately bonded to one side of the dielectric; a second electrode intimately bonded to the opposite side of the dielectric which is divided into two portions joined to one another by a narrow connecting bridge, each of said portions being of a width less than one half the wave length in the dielectric of the frequencies to be passed through the capacitor, and the total width of said portions being of the order of magnitude of a half wave length in the dielectric of higher frequencies to be passed by the capacitor.

4. In a capacitor for operation at very-high and ultra-high frequencies the combination comprising a high K dielectric of a value greater than 10; an electrode along one surface of the dielectric; a second electrode along the opposite surface of the dielectric which is subdivided into two portions each of which has a width less than one half of the wave length in the dielectric of the highest frequencies desired to be passed through the capacitor, the total width of said portions being of the order of magnitude of a half wave length in the dielectric of higher frequencies to be passed by the capacitor; and an inductive connecting bridge joining the two portions of the second electrode.

5. In a capacitor for operation at very-high and ultra-high frequencies the combination comprising a high K dielectric of a value greater than 10; an electrode along one surface of the dielectric; a second electrode along the opposite surface of the dielectric which is subdivided into two portions each of which has a width less than one half of the wave length in the dielectric of the highest frequencies desired to be passed through the capacitor; a narrow connecting bridge joining the two portions of the second electrode; and a mounting member on one of said portions for securing the capacitor to a conducting member, whereby the second of said portions will be connected solely through the connecting bridge, the other portion, and the mounting member to such a conducting member.

6. In a feed-through capacitor for operation at very-high and ultra-high frequencies the combination comprising a tubular dielectric of a high K material having a value of K greater than 10; a conductor extending through the central opening of the tubular dielectric; an electrode on the inner surface of the tubular dielectric that is electrically joined to the conductor; a first outer electrode portion on the outer longitudinal surface of the dielectric that is disposed opposite the electrode on the inner surface, which electrode portion is of a width measured longitudinal of the dielectric less than the one half the wave length in the dielectric of the highest frequencies desired to be passed through the capacitor from electrode to electrode; a second outer electrode portion adjacent but spaced from the first outer electrode which is also of a width less than one half the wave length in the dielectric of the highest frequencies to be passed; a bridging strip of electrode material joining the two outer electrodes which is of a narrow circumferential dimension to form an inductive connection between the electrodes at the higher values of the range of frequencies to be encountered and which isolates the second outer electrode portion from a circuit to which the capacitor may be joined by connection of said conductor and said first outer electrode portion to such circuit.

7. A capacitor in accordance with claim 6 in which the circumferential length of said bridging strip is less than ten circumferential degrees.

8. In a feed-through capacitor for use at radio frequencies the combination for maintaining a low transfer impedance through the capacitor at such radio frequencies comprising a tubular dielectric; an electrode on the inner surface of the tubular dielectric; a conductor adapted for connection into a circuit electrically joined to the inner electrode; a first outer electrode on the outer longitudinal surface of the dielectric disposed opposite the electrode on the inner surface; a second outer electrode adjacent but spaced from the first outer electrode; a narrow conductive bridging strip joining the two outer electrodes that is of a length equal to a minor part of the length of either of said outer electrodes whereby connection of one of said outer electrodes into a circuit joins the other outer electrode to such circuit solely through said bridging strip; and circumferentially extending interruptions within at least one outer electrode dividing such electrode for a major portion of the circumferential dimension.

9. In a capacitor for use at radio frequencies the combination for maintaining a low transfer impedance through the capacitor at such radio frequencies comprising a dielectric; an electrode along one side of the dielectric that is adapted for connection into a circuit; an electrode along the opposite side of the dielectric subdivided by interruption of the electrode surface into several electrode portions; and electrical connections between one of the several portions and each of the other portions wherein each connection includes a narrow connecting bridge of conducting material of a length equal to a minor part of the length of one of said electrode portions, one of said electrode portions being adapted for connection into a circuit whereupon said other portions are joined to such circuit solely through said connecting bridges and the portion connected to such circuit.

10. In a capacitor for use at radio frequencies the combination for maintaining a low transfer impedance through the capacitor at such radio frequencies comprising a tubular dielectric; an electrode along the inner surface forming the opening of the tubular dielectric; an outer electrode along the outer longitudinal side of the dielectric subdivided into several portions by circumferential interruptions, said portions being electrically joined by connecting bridges of small circumferential extent; and a cylindrical shell encircling the outer electrode which is in electrical contact with two of the electrode portions and is itself subdivided by a circumferential interruption into a pair of portions connected by an electrical bridge of small circumferential extent, said bridges isolating portions of the outer electrode from a circuit to which the capacitor may be joined by connection of the electrode along the inner dielectric surface and one of the portions to such circuit.

11. In a feed-through capacitor for operation at very-high and ultra-high frequencies at which an electrode dimension may approach a half wave length the combination for maintaining a low transfer impedance through the capacitor at such frequencies comprising a tubular dielectric having a value of K greater than 10; a conductor extending into the central opening of the tubular dielectric that provides a terminal for the capacitor; an electrode on the inner surface of the tubular dielectric that is electrically joined to the conductor; a first outer electrode portion on the outer longitudinal surface of the dielectric disposed opposite the electrode on the inner surface, which outer electrode forms another terminal for the capacitor; a second outer electrode adjacent but spaced from the first outer electrode; and a bridging connection joining the two outer electrodes to form an inductive connection between the electrodes at the higher values of the range of frequencies to be encountered.

12. In a feed-through capacitor the combination comprising a feed-through conductor; a dielectric of flat wafer configuration encircling the conductor; a first electrode on one face of the dielectric electrically joined to the conductor; a second electrode on the opposite face of the dielectric having two concentric portions with a bridging connection therebetween, whereby said bridging connection forms the sole connection between the portions; and an electrical connection between one portion and part of the capacitor to be connected in a circuit, said other portion being isolated from the part of the capacitor to be connected in a circuit by said bridging connection.

13. In a capacitor, for radio frequencies at which an electrode dimension of the capacitor approaches a half wave length in the capacitor dielectric, the combination for minimizing resonant effects in the capacitor comprising a tubular dielectric of high K material; an inner electrode in the inside longitudinal face of said dielectric; a conductor extending through the dielectric connected to said electrode; an outer electrode on the outer longitudinal face of said dielectric that is subdivided into a first ground portion and a second stand-off portion longitudinally disposed of the ground portion; and an inductive connection between the two portions of a length that is no greater than a minor fraction of the length of either portion, which inductive connection provides the sole circuit connection for the second stand-off portion and thereby isolates the second stand-off portion from a ground connection of the first ground portion through the inductive characteristic thereof.

14. A capacitor in accordance with claim 13 in which said two electrode portions have a characteristic impedance Z in combination with the inner electrode; the ground portion in combination with the inner electrode has a phase measure $b_1$; the stand-off portion in combination with the inner electrode has a phase measure $b_2$; the transfer impedance $Z_t$ may be expressed as approximately $$\frac{jwL - jZ/\sin b_2}{\cos b_1 - \frac{wL}{Z} \sin b_1 + \sin b_1 \cot b_2}$$

and wherein L, the inductance of said connection, is of a value making the numerator small in value at frequencies where the denominator passes through zero value.

15. In a capacitor for use at radio frequencies at which an electrode dimension may approach a half wave length in the capacitor dielectric the combination for maintaining a low impedance capacitive characteristic for such frequencies which comprises: a dielectric of high K value; a first electrode with a terminal for connection in a circuit, which electrode is disposed upon one side of the dielectric; a second electrode disposed upon the opposite side of the dielectric and which is subdivided into a terminal portion and an isolated portion, each of said portions being of a dimension less than a half wave length in the dielectric of frequencies to be passed through the capacitor; ground connection means on said terminal portion for providing a circuit connection for the second electrode of the capacitor; and an inductance forming the sole connection between said isolated electrode portion of said second electrode and the ground of said ground connection means.

References Cited in the file of this patent

UNITED STATES PATENTS

| | | |
|---|---|---|
| 2,271,870 | Mason | Feb. 3, 1942 |
| 2,411,555 | Rogers | Nov. 26, 1946 |
| 2,416,683 | Finch et al. | Mar. 4, 1947 |
| 2,456,803 | Wheeler | Dec. 21, 1948 |
| 2,894,221 | Coy | July 9, 1959 |
| 2,922,968 | Van Patten | Jan. 26, 1960 |

UNITED STATES PATENT OFFICE
CERTIFICATE OF CORRECTION

Patent No. 3,007,121　　　　　　　　　　October 31, 1961

Heinz M. Schlicke

It is hereby certified that error appears in the above numbered patent requiring correction and that the said Letters Patent should read as corrected below.

Column 2, line 54, for "shield" read -- shielded --; column 5, line 14, for "occurence" read -- occurrence --; column 7, line 32, after "dimension" insert -- at --; line 50, for "on" read -- one --.

Signed and sealed this 17th day of April 1962.

(SEAL)
Attest:

ESTON G. JOHNSON　　　　　　　　　　DAVID L. LADD
Attesting Officer　　　　　　　　　　Commissioner of Patents